United States Patent
Imaki

(10) Patent No.: US 7,027,707 B2
(45) Date of Patent: Apr. 11, 2006

(54) ALIGNING IMPLEMENT FOR OPTICAL FIBERS AND OPTICAL FIBER ARRAY FABRICATED BY USE OF THE ALIGNING IMPLEMENT

(75) Inventor: Osamu Imaki, Hachioji (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 0 days.

(21) Appl. No.: 11/151,874

(22) Filed: Jun. 13, 2005

(65) Prior Publication Data
US 2005/0232569 A1 Oct. 20, 2005

Related U.S. Application Data

(63) Continuation of application No. 10/722,774, filed on Nov. 25, 2003, now abandoned.

(30) Foreign Application Priority Data
Dec. 3, 2002 (JP) .............................. 2002-351046

(51) Int. Cl.
*G02B 6/00* (2006.01)
(52) U.S. Cl. ...................................... 385/137; 428/167
(58) Field of Classification Search ........ 385/134–139, 385/11, 70, 71; 428/167, 168
See application file for complete search history.

(56) References Cited

U.S. PATENT DOCUMENTS 4,762,387 A   8/1988   Batdorf et al. ............. 350/96.2
5,997,990 A * 12/1999   Kambara et al. ........... 428/167

FOREIGN PATENT DOCUMENTS

| EP | 0826996 | 3/1998 |
|---|---|---|
| JP | 59121983 | 7/1984 |
| JP | H226395 | 6/1990 |
| JP | 5134146 | 5/1993 |
| JP | 7198995 | 8/1995 |

* cited by examiner

*Primary Examiner*—Javaid H. Nasri
(74) *Attorney, Agent, or Firm*—David N. Lathrop, Esq.; Gallagher & Lathrop

(57) ABSTRACT

There is provided an aligning implement for optical fibers by which an optical fiber array having a plurality of optical fibers aligned substantially in parallel with one another with a predetermined pitch therebetween can easily be fabricated. The aligning implement comprises a substrate having a plurality of ridges formed on one surface thereof with the predetermined pitch and aligned substantially in parallel with one another, and a cover member having a plurality of ridges formed on one surface thereof with the predetermined pitch and aligned substantially in parallel with one another. The widths of the ridges of the substrate and of the cover member are set to have such values that the cover member is movable relative to the substrate in the direction substantially orthogonal to the ridges in a state that the ridges of the substrate and of the cover member are engaged with one another, and each optical fiber is nipped, positioned and held between the wall surface of each ridge of the substrate and the wall surface of each corresponding ridge of the cover member by sliding of the cover member in the direction substantially orthogonal to the ridges.

12 Claims, 15 Drawing Sheets

ALIGNING IMPLEMENT FOR OPTICAL FIBERS AND OPTICAL FIBER ARRAY FABRICATED BY USE OF THE ALIGNING IMPLEMENT

This application is a continuation of application Ser. No. 100/722,774, filed Oct. 25, 2003, now abandoned.

BACKGROUND OF THE INVENTION

1. Field of the Invention

The present invention relates to an optical fiber array provided with a plurality of optical fibers that are aligned substantially in parallel with one another with a predetermined pitch therebetween, and more particularly, to an aligning implement for optical fibers that makes the fabrication of a optical fiber array easy, and to an optical fiber array fabricated by use of the aligning implement.

2. Description of the Related Art

As is well known, an optical fiber array is fabricated by use of an aligning implement or element that functions to align a plurality of optical fibers substantially in parallel with one another with a predetermined pitch therebetween. An optical fiber array is used, for example, in an optical module that is capable of transmitting and/or receiving a plurality of optical signals in order to transmit a plurality of optical signals emitted from a surface light emitting type optical element such as, for example, a laser diode array to an external circuit, device, apparatus or the like or to enter a plurality of optical signals transmitted from an external circuit, device, apparatus or the like into a surface light receiving type optical element such as, for example, a photodiode array. In addition, an optical fiber array is also used in an optical connector or in case of connecting two optical fiber arrays with each other.

FIG. 1 is a front view showing a prior art optical fiber array fabricated by use of a prior art aligning implement for optical fibers, and FIG. 2 is a front view showing the prior art optical fiber array in FIG. 1 in a state that a V-groove formed substrate and a lid member of the aligning implement for optical are being separated. The aligning implement 10 for optical fibers used in this optical fiber array comprises a V-groove formed substrate 12 having a plurality of (eight, in this example) V-grooves (each having a V-shape in section) 14 formed substantially in parallel with one another with a predetermined pitch therebetween on one surface (top surface in the figure) of a substrate (for example, a single crystal silicon substrate) having a generally rectangular or square shape in plan, for example, and a lid member 13 having a generally rectangular or square shape in plan, that is mounted on the top surface of the V-groove formed substrate 12.

A plurality of (eight, in this example) optical fibers 11 are disposed in the corresponding V-grooves 14 of the V-groove formed substrate 12, respectively, and the lid member 13 is mounted and fixed on the top surface of the V-groove formed substrate 12 in such manner that the lid member 13 covers the surface of the V-grooves 14. As a result, as shown in FIG. 1, each optical fiber 11 is located and secured in the corresponding V-groove 14, and the plurality of optical fibers 11 are aligned with a predetermined pitch therebetween and an optical fiber array is thus fabricated. Since the V-grooves 14 have been aligned and formed with high accuracy, the plurality of optical fibers 11 positioned and secured in the respective V-grooves 14 have been aligned with a predetermined pitch therebetween with high accuracy. Further, in general, in case of fixing the optical fibers 11 each having a sheathing or jacket on the external surface thereof on the V-groove formed substrate 12 by use of an adhesive, the lid member 13 is adhered and fixed on the V-groove formed substrate 12 together with the optical fibers 11 by the adhesive flowing toward the V-grooves 14 of the V-groove formed substrate 12 and the lid member 13. It is needless to say that the lid member 13 may be fixed on the V-groove formed substrate 12 by use of any other means.

Next, a manufacturing method of the above-described optical fiber array will be described in detail with reference to FIGS. 3 to 5. FIG. 3 is a plan view showing the V-groove formed substrate 12 shown in FIGS. 1 and 2, FIG. 4 is a plan view showing a state that the optical fibers 11 have been aligned on the V-groove formed substrate 12 shown in FIG. 3, and FIG. 5 is a plan view showing a state that the lid member 13 has been mounted on the V-groove formed substrate 12 in such manner that the lid member 13 covers the surface of the V-grooves 14 of the V-groove formed substrate 12. As shown in FIG. 3, the V-groove formed substrate 12 is a plate-like substrate having a generally square shape in plan in this example, and on about the central portion thereof is formed a step portion 15 extending linearly from the upper end thereof to the lower end thereof so that two areas the thickness (height) of which differs from each other are formed on both sides of the linear step portion 15. Each of the areas has a generally rectangular shape in plan. In the illustrated example, the two areas 12L and 12R each having a generally rectangular shape in plan are formed on the left-hand side and right-hand side of the step portion 15 respectively, and a plurality of (eight, in this example) V-grooves 14 are formed with a predetermined pitch therebetween with high precision on the left-hand side area 12L. The right-hand side area 12R of the V-groove formed substrate 12 has its thickness thinner (its height lower) than that of the left-hand side area 12L on which the V-grooves 14 are formed.

The reason that a difference in thickness or level is provided between the left side area 12L and the right side area 12R of the V-groove formed substrate 12 is such that as shown in FIGS. 1 and 2, the optical fibers 11 can be closely positioned and fixed in the corresponding V-grooves 14, that is, the optical fibers 11 can be positioned and fixed in the corresponding V-grooves 14 in such manner that each optical fiber is in contact with the both wall surfaces of the corresponding V-groove. As shown in FIGS. 4 and 5, since only the optical fibers (the core and the cladding covering the exterior surface thereof) 11 are disposed in the V-grooves 14, it is difficult to closely locate and secure the optical fibers 11 in the corresponding V-grooves 14 when the surface of the V-grooves 14 is covered with the lid member 13 unless the thickness of the right side area 12R of the V-groove formed substrate 12 on which the sheathings (jackets) 11B covering the optical fibers 11 and having larger diameters are put is thinner than that of the left side area 12L (unless the height of the right side area 12R is lower than that of the left side area 12L). Accordingly, it is preferred that the difference in thickness or height between the left side area 12L and the right side area 12R of the V-groove formed substrate 12 is set to be equal to or somewhat larger than a difference between the diameter of the optical fiber 11 and the diameter of the jacket 11B.

As shown in FIG. 4, the optical fibers 11 are disposed in the corresponding V-grooves 14 of the V-groove formed substrate 12 shown in FIG. 3 respectively as well as the jackets 11B of the optical fibers 11 are disposed on the right side area 12R, and then the optical fibers 11 are aligned. Next, as shown in FIG. 5, the lid member 13 is mounted on the left side area 12L of the V-groove formed substrate 12 in such manner that the lid member 13 covers the surface of the V-grooves 14 of the V-groove formed substrate 12, and then it is fixed thereon by use of, for example, an adhesive. Thereafter, the portions of the optical fibers 11 projecting from the end surface of the left side area 12L of the V-groove formed substrate 12 are severed and removed, and thus, an optical fiber array is completed.

Further, after the projecting portions of the optical fibers 11 have been severed, it is preferred to abrade and polish the end surfaces of the optical fibers 11. In such case, the end surface of the left side area 12L (the end surfaces of the V-grooves 14) of the V-groove formed substrate 12 and the end surface of the lid member 13 may be abraded and polished together with the end surfaces of the optical fibers 11.

In case of fabricating an optical fiber by use of the V-groove formed substrate 12 like the above prior art, it is required to dispose the optical fibers 11 in the corresponding V-grooves 14 of the V-groove formed substrate 12 one by one and to align the jackets 11B of the optical fibers 11 on the V-groove formed substrate 12 with accuracy. Since the width of each V-groove 14 is very narrow and the diameter of each optical fiber 11 is much smaller, the above-described work or job is very complicated and troublesome, and hence there are problems that it takes a lot of time as well as great skill is required.

On the other hand, another prior art aligning implement for optical fibers is described in, for example, Japanese Patent Application Publication No. 02-26395 (26395/1990). Unlike an aligning implement for aligning a plurality of optical fibers in a line as the above-described prior art, this another prior art aligning implement functions to align a plurality of optical fibers in plural lines. The prior art aligning implement disclosed in Japanese Patent Application Publication No. 02-26395 will be briefly explained with reference to FIGS. 6 to 8.

As shown in FIG. 6, in the prior art aligning implement for optical fibers, there is provided a positioning plate 20 in which a plurality of through holes 21 each having a generally rhombic shape in section are formed in a matrix manner (in this example, a matrix of 4×8) through a substrate 22 having a generally rectangular shape in plan, and the aligning implement for optical fibers is constructed by use of two positioning plates 20. As shown in FIG. 7, the two positioning plates 20A and 20B are laid one on top of the other in the state that the rhombic through holes 21A and 21B (see FIG. 8) of the two positioning plates 20A and 20B are aligned with each other, and then optical fibers 11 are inserted into corresponding through holes 21A and 21B one fiber for one hole. Thereafter, as shown in FIG. 8 by an arrow 23, the front side positioning plate 20A, for example, is moved in the direction of an extension of a diagonal line connecting between two opposed acute angles of each through hole 21B. As a result, each optical fiber 11 is caught and held between the wall surfaces of each through hole 21A of the front side positioning plate 20A, the wall surfaces forming one of the two acute angles of each through hole 21A, and the wall surfaces of each corresponding through hole 21B of the rear side positioning plate 20B, the wall surfaces forming the opposite angle of the two acute angles of each through hole 21B, as shown in FIG. 8. Thus, the 32 optical fibers 11 can be aligned in four rows each having eight optical fibers, namely, in a matrix of 4×8. It goes without saying that if there is used a positioning plate in which a plurality of through holes 21 each having a generally rhombic shape in section are formed in a line through a substrate 22 having a generally rectangular shape in plan, a plurality of optical fibers 11 can be aligned in a line.

In case a plurality of optical fibers are aligned in a line or plural lines by use of two positioning plates as described in the above Japanese Patent Application Publication No. 02-26395, the plurality of optical fibers are merely inserted into the corresponding through holes each having a generally rhombic shape of the two positioning plates that are laid one on top of the other. Therefore, it is unnecessary to align the optical fibers one by one on a V-groove formed substrate with high accuracy as in the first prior art described above. Consequently, there is no need for carrying out a work or job that is very complicated and troublesome and takes a lot of time, and also great skill is not required. Accordingly, it is possible to align a plurality of optical fibers comparatively with ease.

However, in the prior art disclosed in the above Japanese Patent Application Publication No. 02-26395, forces or pressures of opposite directions are applied to each optical fiber at different positions thereof in the axial direction from the side of the optical fiber by the two positioning plates, that is, a couple of forces is applied to each optical fiber. As a result, there occurs a problem that positioning of the optical fibers cannot be accomplished with high precision for reason that ends of optical fibers are deviated or deflected due to a bending moment of the couple, for example.

SUMMARY OF THE INVENTION

It is an object of the present invention to provide an aligning implement for optical fibers by which a plurality of optical fibers can be easily aligned with one another with high accuracy.

It is another object of the present invention to provide an optical fiber array having high accuracy that is fabricated by use of the aforesaid aligning implement for optical fibers.

In order to accomplish the foregoing objects, in a first aspect of the present invention, there is provided an aligning implement for optical fibers for aligning a plurality of optical fibers, that is adapted to be used in an optical fiber array having a plurality of optical fibers aligned substantially in parallel with one another with a predetermined pitch therebetween, the aligning implement comprising: a substrate having a plurality of ridges formed on one surface of the substrate substantially in parallel with one another with the predetermined pitch; and a cover member having a plurality of ridges formed on one surface of the cover member substantially in parallel with one another with the predetermined pitch, and wherein the width of the ridges of the substrate and the width of the ridges of the cover member are set to have such values that the cover member is movable relative to the substrate in the direction substantially orthogonal to the ridges in a state that the ridges of the substrate and the ridges of the cover member are engaged with one another, and the substrate and the cover member are arranged such that in the state that the ridges of the substrate and the ridges of the cover member are engaged with one another, sliding of the cover member in the direction substantially orthogonal to the ridges relative to the substrate causes each optical fiber to be nipped, positioned and held between the wall surface of each ridge of the substrate and the wall surface of each corresponding ridge of the cover member.

In a preferred embodiment, the one surface of the substrate is formed such that the thickness of one side thereof is thicker than that of the other side thereof, and the ridges are formed on the thicker side surface and optical fibers each having a sheathing are put on the thinner side surface.

In another preferred embodiment, at least one guide groove is formed on either one of the substrate or the cover member in the direction substantially orthogonal to the ridges, and on the other of the substrate or the cover member is formed at least one protrusion that is fitted in and guided by the guide groove.

The substrate and the cover member may be formed by applying a dry etching to a silicon substrate. Alternatively, the substrate and the cover member may be formed by applying a dry etching to a silicon substrate.

In a second aspect of the present invention, there is provided an optical fiber array comprising the aforesaid aligning implement for optical fibers.

With the construction as described above, each optical fiber is merely put in the space that is comparatively enough room for the optical fiber between the adjacent ridges of the substrate, and there is no need to align the optical fibers accurately. Consequently, the work of putting the optical fibers on the substrate becomes very easy and the working hours can be greatly reduced. Accordingly, the working efficiency is remarkably improved. In addition, the ridges of the cover member and the ridges of the substrate are merely engaged with one another in such manner that each of the optical fibers is located between one of the ridges of the cover member and the corresponding one of the ridges of the substrate, and the respective optical fibers are positioned and held by sliding the cover member thereby to nip each optical fiber between the two wall surfaces of the two ridges. Therefore, each optical fiber has pushing forces or pressures applied thereto at the same positions in the axial direction. For this reason, the optical fibers can be stably positioned, held and aligned with high accuracy.

BRIEF DESCRIPTION OF THE DRAWINGS

FIG. 12 shows a substrate of a second embodiment of the aligning implement according to the present invention, wherein

FIG. 13 shows a cover member of a second embodiment of the aligning implement according to the present invention, wherein

DETAILED DESCRIPTION OF THE PREFERRED EMBODIMENTS

The preferred embodiments of the present invention will now be described in detail with reference to FIGS. 9 to 20. The present invention may, however, be embodied in many different forms and should not be construed as limited to the embodiments set forth hereinafter; rather, the embodiments are provided so that this disclosure will be thorough and complete, and will fully convey the scope of the invention to those skilled in the art.

First, there will be described a first embodiment of the aligning implement for optical fibers according to the present invention and an optical fiber array according to the present invention fabricated by use of the first embodiment of the aligning implement in detail with reference to FIGS. 9 to 11.

Figure 1:
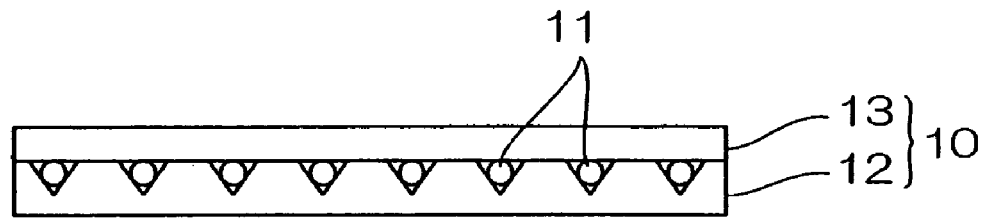
FIG. 1 is a front view showing a prior art optical fiber array fabricated by use of a prior art aligning implement for optical fibers.
Figure 2:
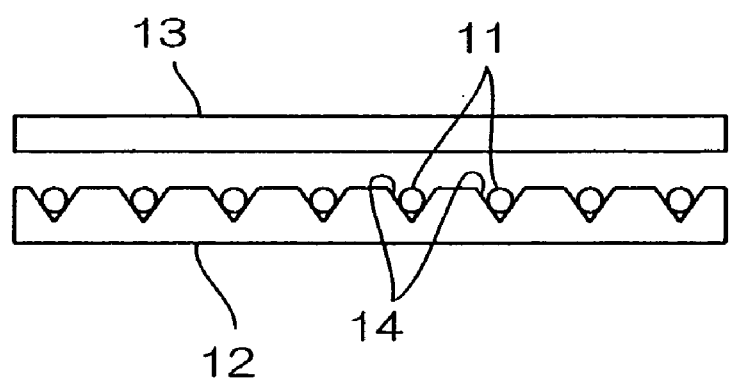
FIG. 2 is a front view showing the prior art optical fiber array in FIG. 1 in a state that a V-groove formed substrate and a lid member of the aligning implement for optical are being separated.
Figure 3:
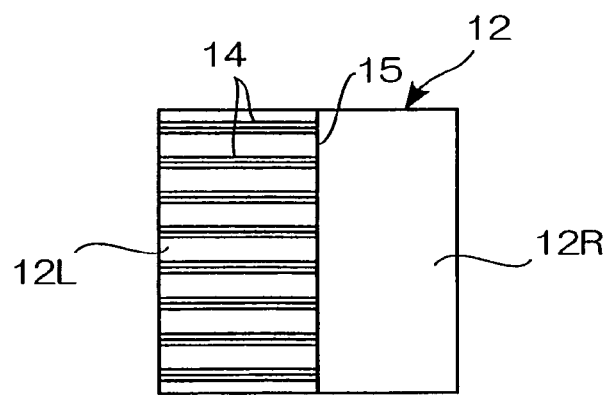
FIG. 3 is a plan view showing the V-groove formed substrate shown in FIGS. 1 and 2.
Figure 4:
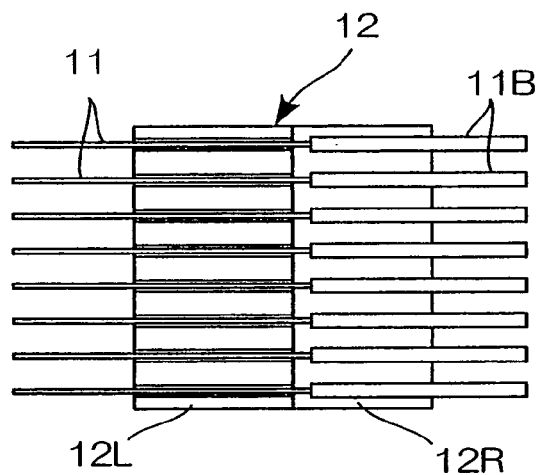
FIG. 4 is a plan view showing a state that a plurality of optical fibers have been disposed and aligned on the V-groove formed substrate 12 shown in FIG. 3.
Figure 5:
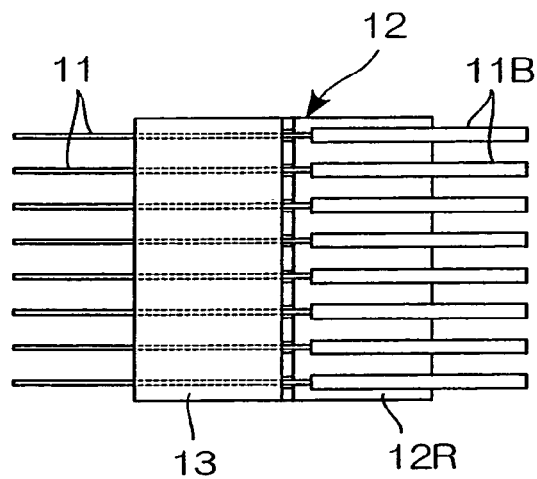
FIG. 5 is a plan view showing a state that the lid member has been mounted on the V-groove formed substrate shown in FIG. 4.
Figure 6:
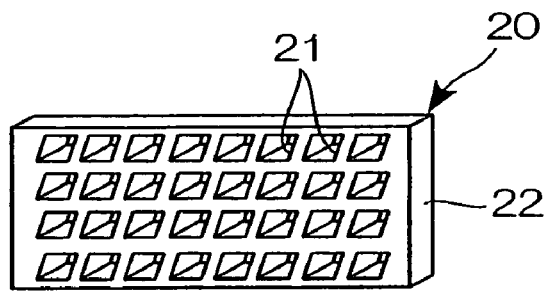
FIG. 6 is a perspective view illustrating a positioning plate that is a component of another prior art aligning implement for optical fibers.
Figure 7:
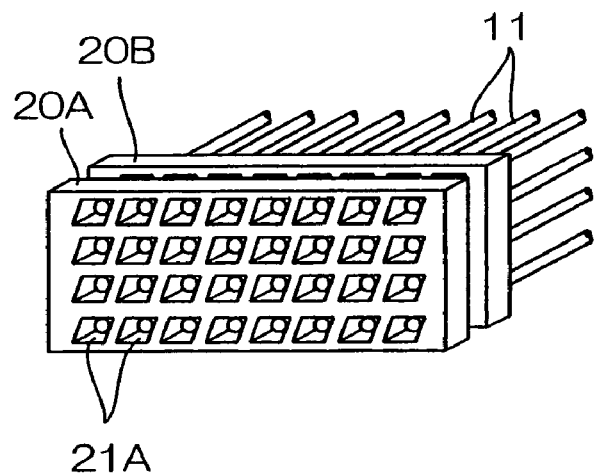
FIG. 7 is a perspective view showing a state that a plurality of optical fibers have been aligned in plural lines by use of two of the positioning plate shown in FIG. 6.
Figure 8:
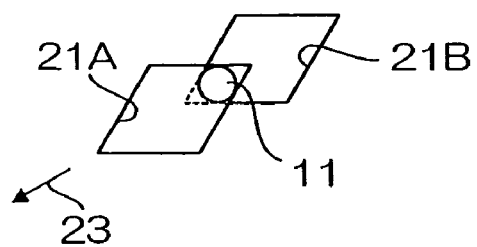
FIG. 8 is an illustration for explaining a manner that an optical fiber is positioned and held by two through holes each having a generally rhombic shape in section.
Figure 9:
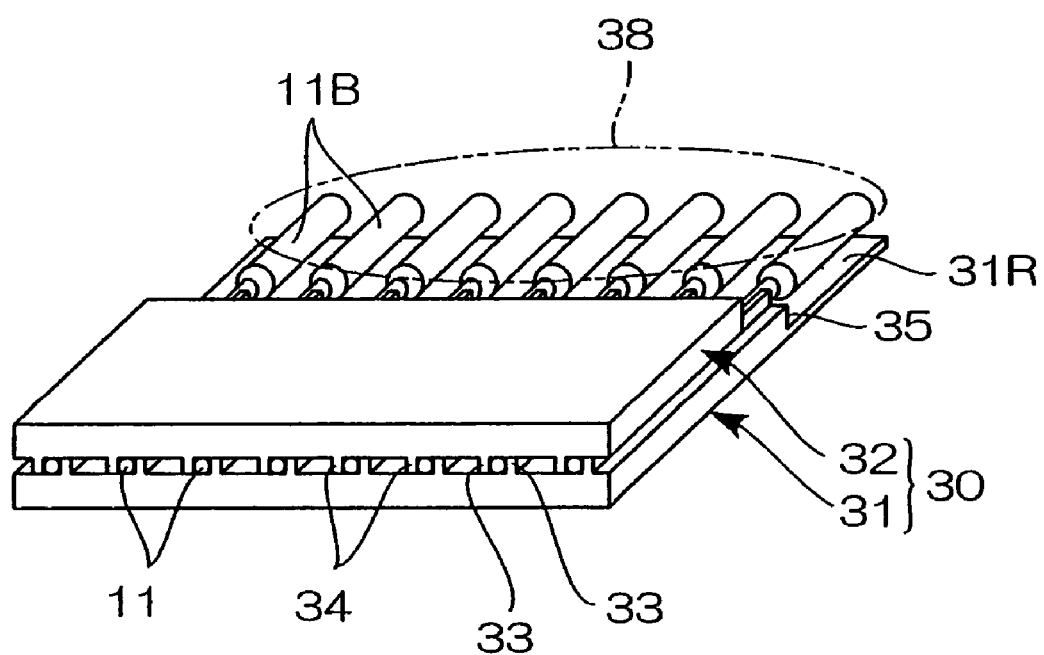
FIG. 9 is a perspective view showing an optical fiber array according to the present invention fabricated by use of a first embodiment of the aligning implement for optical fibers according to the present invention.
Figure 10A:
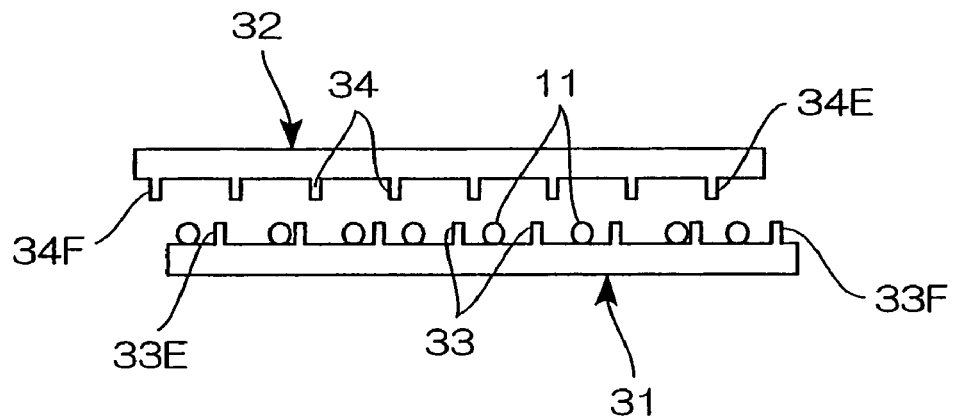
FIGS. 10A, 10B and 10C are front views for explaining a manufacturing process of the optical fiber array shown in FIG. 9.
Figure 10B:
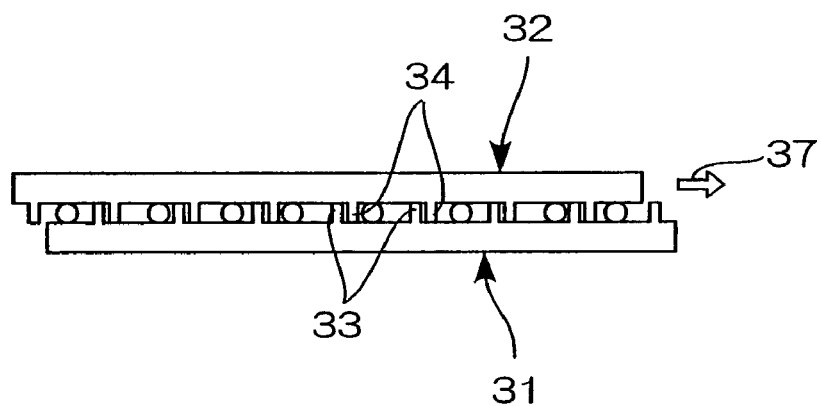
Figure 10C:
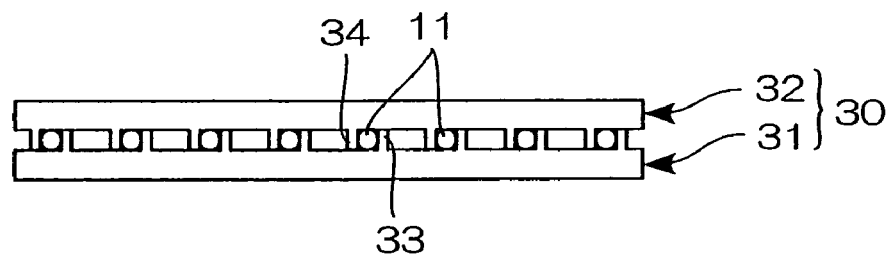

FIG. 9 is a perspective view showing the optical fiber array according to the present invention fabricated by use of the first embodiment of the aligning implement for optical fibers according to the present invention, FIGS. 10A, 10B and 10C are front views for explaining a manufacturing process of the optical fiber array shown in FIG. 9, and FIG. 11A, 11B and 11C are plan views for explaining a manufacturing process of the optical fiber array shown in FIG. 9. Further, in FIGS. 9 to 11, elements, members and portions therein corresponding to those in FIGS. 1 to 5 will be shown by the same reference characters or numbers affixed thereto, and explanation thereof will be omitted unless necessary.

Figure 11A:
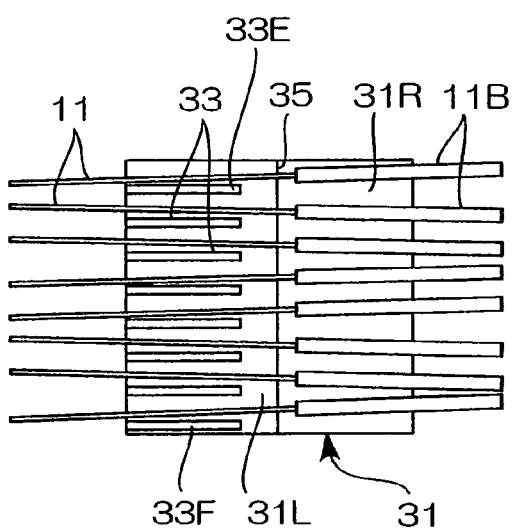
FIGS. 11A, 11B and 11C are plan views for explaining a manufacturing process of the optical fiber array shown in FIG. 9.

The aligning implement 30 for optical fibers of the first embodiment comprises a cover member or component 32 having a generally rectangular shape in plan and a substrate 31 having a generally rectangular or square shape in plan. As shown in FIG. 11A, in this embodiment, the substrate 31 is a plate-like member having a generally square shape in plan, and on substantially the central portion of one surface (the top surface in this embodiment) of the substrate 31 is formed a step portion 35 extending linearly from the upper end thereof to the lower end thereof so that a first and a second areas 31L and 31R differing in thickness (height) thereof from each other are formed on both sides (left-hand side and right-hand side in the figure) of the linear step portion 35. Each of the areas 31L and 31R has a generally rectangular shape in plan. On the first area 31L of a generally rectangle in plan situated at one side of the step portion 35 are formed a plurality of (eight, in this example) ridges or ribs 33 in parallel with one another with a predetermined pitch therebetween and with high accuracy. The ridges 33 extend from the edge of the major side of the first area 31L toward the second area 31R situated at the other side of the step portion 35. The pitch of the ridges 33 is set to be equal to the pitch of optical fibers of an optical fiber array to be fabricated. Each ridge 33 has a generally rectangular shape in section, stands erect from the top surface of the substrate 31, and extends until a position that is a little short of the step portion 35.

Optical fibers 11 are put on elongate spaces formed between the adjacent ridges 33 on the first area 31L, respectively. Further, in this embodiment, the leftmost ridge 33E in FIG. 10A (the uppermost ridge 33E in FIG. 11A) among the ridges 33 formed on the first area 31L is formed at a position on the first area 31L by which an elongate region remains on the outside of the leftmost ridge 33E (between the leftmost ridge 33E and one end of the first area 31L), the elongate region having its width that is sufficient to put an optical fiber thereon. Accordingly, an optical fiber 11 is also put on the elongate region remaining on the outside of the ridge 33E. Consequently, a number of optical fibers 11 equal to the number of the ridges 33 are put on the substrate 31.

The optical fibers 11 extend on the substrate 31 from the second area 31R of a generally rectangle in plan situated at the other side of the step portion 35 to the first area 31L situated at the one side of the step portion 35, and on the second area 31R are put the optical fibers 11 having sheathings or jackets 11B. For this reason, likewise the above-described first prior art, the second area 31R has its thickness thinner (its height lower) than that of the first area 31L. It is preferred that the difference in thickness or height between the first area 31L and the second area 31R of the substrate 31 is set to be equal to or somewhat larger than a difference between the diameter of the optical fiber 11 and the diameter of the jacket 11B.

Figure 11B:
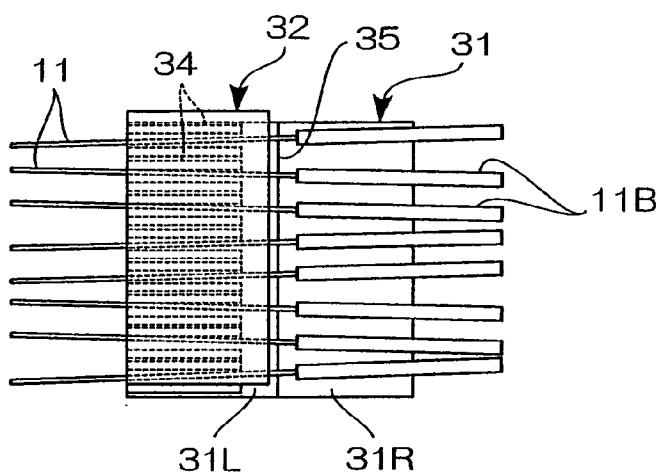
Figure 11C:
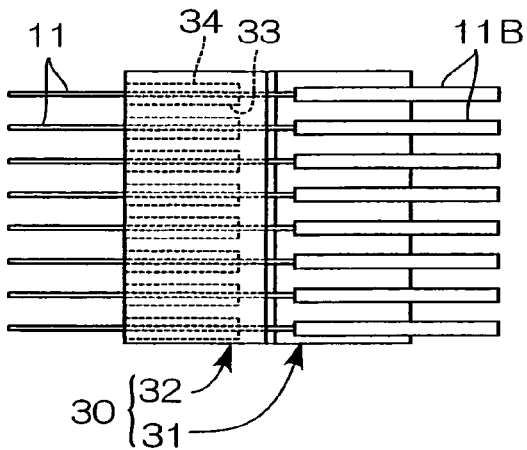

The cover member 32 is a plate-like member having a generally rectangular shape in plan as shown in FIGS. 9, 11B and 11C, and is mounted on the substrate 31 in such manner that it covers the top surface of the first area 31L of the substrate 31. Accordingly, as will be understood from FIGS. 11B and 11C, the size in plan of the cover member 32 is substantially equal to that of the first area 31L of the substrate 31.

The cover member 32 has a plurality of (eight, in this embodiment) ridges or ribs 34 formed on the bottom surface thereof in parallel with one another with the same pitch as that of the ridges 33 of the substrate 31 and with high accuracy. The ridges 34 extend from the edge of one major side of the cover member 32 toward the edge of the other major side of the cover member 32. Each ridge 34 has a generally rectangular shape in section, stands erect from the bottom surface of the cover member 32, and extends until a position that is a little short of the edge of the other major side. As will be understood from FIG. 10A, among the ridges 34 formed on the cover member 32, the ridge 34E situated at the end position of the cover member 32 (the rightmost ridge 34E in FIG. 10A) that is opposite to the ridge 33E formed on the substrate 31 at the one end position thereof is formed at a position on the cover member 32 by which an elongate region remains on the outside of the ridge 34E, the elongate region having its area that is substantially equal to that of the elongate region remaining on the outside of the ridge 33E of the substrate 31 formed at the one end position thereof.

The height and width of each ridge 33 of the substrate 31 are substantially equal to the height and width of each ridge 34 of the cover member 32, and the height is set in size to be substantially equal to the diameter of the optical fiber 1. The reason is that as shown in FIGS. 9, 10B and 10C, when the ridges 34 of the cover member 32 are engaged with the ridges 33 of the substrate 31, the optical fibers 11 are brought into contact with the bottom surface of the cover member 32 and the top surface of the substrate 31. In addition, the length of each ridge 33 of the substrate 31 is substantially equal to that of each ridge 34 of the cover member 32, and accordingly, the length and width of each elongate space formed between the adjacent ridges 34 are substantially equal to the length and width of each elongate space formed between the adjacent ridges 33 of the substrate 31. The width of each space depends upon the fiber pitch of the optical fiber array, and in this embodiment, is set to be substantially equal to about three times the diameter of the optical fiber 11.

Now, a method of manufacturing an optical fiber array using the aligning implement 30 for optical fibers constructed as described above will be described with reference to FIGS. 10A to 10C and FIGS. 11A to 11B.

First, as shown in FIGS. 10A and 11A, the optical fibers (core and cladding) 11 are put in the corresponding spaces between the adjacent ridges 33 of the substrate 31 one fiber for one space and on the elongate region outside of the ridge 33E positioned at the one end of the substrate 31. In such case, the portions of the optical fibers 11 covered with the jackets 11B are put on the second area 31R of the substrate 31.

Next, the cover member 32 is placed over the first area 31L of the substrate 31, and then the ridges 34 of the cover member 32 are engaged with the ridges 33 of the substrate 31 in such manner that each of the optical fibers 11 is positioned between the ridge 34 of the cover member 32 and the corresponding ridge 33 of the substrate 31, as shown in FIGS. 10B and 10B.

Next, the cover member 32 is slid, as shown in FIG. 10B by an arrow 37, in the direction that each optical fiber 11 will be caught between the ridge 34 of the cover member 32 and the corresponding ridge 33 of the substrate 31 (to the right-hand side in FIG. 10B). By this sliding of the cover member 32, the wall surface of the ridge 34 of the cover member 32 presses each optical fiber 11 against the wall surface of the corresponding ridge 33 of the substrate 31, and the optical fibers 11 are nipped and held between the wall surfaces of the ridges 34 and the wall surfaces of the ridges 33, respectively, as shown in FIG. 10C.

Thus, each optical fiber 11 is positioned and held in its both side portions by the wall surface of the ridge 34 of the cover member 32 and the wall surface of the corresponding ridge 33 of the substrate 31 as well as is positioned and held in its top and bottom portions by the bottom surface of the cover member 32 and the top surface of the substrate 31. As a result, the plural optical fibers 11 are aligned with the predetermined pitch and with high precision. Moreover, each optical fiber 11 has pushing forces or pressures applied thereto at the same positions in the axial direction.

In the state that the optical fibers 11 have been positioned and aligned by the optical fiber aligning implement 30 as discussed above, as indicated in FIG. 9 by a chain or phantom line, an adhesive 38, for example, is applied from the above of the jackets 11B of the optical fibers 11 aligned and put on the second area 31R of the substrate 31 to the jackets 11B. When the adhesive 38 is applied to the jackets 11B, it is preferable to slant the substrate 31 slightly so that the adhesive 38 can flow toward the first area 31L of the substrate 31. As a result, the jackets 11B of the optical fibers 11 are adhered and fixed to the substrate 31, and further, the adhesive 38 flows toward the first area 31L of the substrate 31 and enters between the substrate 31 and the cover member 32 so that the substrate 31 and the cover member 32 are adhered and fixed to each other as well as the optical fibers 11 are adhered and fixed to the substrate 31 and the cover member 32. As an adhesive, an epoxy system thermosetting adhesive may be used, for example. It is needless to say that the jackets 11B of the optical fibers 11 may be fixed to the substrate 31, the substrate 31 and the cover member 32 may be fixed to each other, and the optical fibers 11 may be fixed to the substrate 31 and the cover member 32 by use of other means than an adhesive.

In case the optical fiber aligning implement 30 constructed as mentioned above is used, as can easily be understood from FIG. 11A, each optical fiber 11 is merely put in the space that is comparatively enough room for the optical fiber 11 between the adjacent ridges 33 of the substrate 31, and there is no need to align the optical fibers 11 accurately. Accordingly, as compared with the prior art in which a plurality of optical fibers are disposed in the V-grooves one fiber for one groove, the work of putting the optical fibers 11 on the substrate 31 becomes very easy and hence the working hours can be greatly reduced. Accordingly, the working efficiency is remarkably improved. In addition, the respective optical fibers 11 are positioned and held by engaging the ridges 34 of the cover member 32 and the ridges 33 of the substrate 31 with one another in such manner that each of the optical fibers 11 is located between one of the ridges 34 of the cover member 32 and the corresponding one of the ridges 33 of the substrate 31 and by sliding the cover member 32 relative to the substrate 31. Therefore, each optical fiber 11 has pushing forces or pressures applied thereto at the same positions in the axial direction. For this reason, there entirely occurs no problem that ends of the optical fibers are deviated or deflected, for example, and hence the optical fibers 11 can be positioned, held and aligned with high accuracy. As a result, by use of the optical fiber aligning implement of the first embodiment, the optical fiber array shown in FIG. 9 can easily be fabricated with high accuracy.

Further, in the first embodiment, the width of each ridge 33 of the substrate 31 and the width of each ridge 34 of the cover member 32 are set to the same size or value. The widths of each ridge 34 and each ridge 33 may be set to such sizes that in case the cover member 32 and the substrate 31 have been combined together (the ridges 34 of the cover member 32 and the ridges 33 of the substrate 31 have been engaged with one another) in such manner that each of the optical fibers 11 is positioned between one of the ridges 34 of the cover member 32 and the corresponding one of the ridges 33 of the substrate 31, the cover member 32 is movable relative to the substrate 31 in the direction that the respective optical fibers 11 are nipped and held by the cover member 32 and the substrate 31. For example, assuming that the width of each ridge 34 and the width of each ridge 34 are set to the same value W, the alignment pitch of the optical fibers 11 is P, and the diameter of each optical fiber 11 is D, the width W of each ridge 33 and 34 may be set to have a value defined by the following inequality.

$$W<(P-D)/2$$

In such case, if the width W of each ridge 33 and 34 is set to have a value defined by an inequality $W<<(P-D)/2$, each space between the adjacent ridges 33 of the substrate 31 is further increased in its width (each space between the adjacent ridges 34 of the cover member 32 is also further increased in its width). As a result, there is obtained an advantage that the work of putting the optical fibers 11 on the substrate 31 becomes much easier.

Portions of the optical fibers 11 projecting from the end surface of the optical fiber aligning implement 30 are severed and removed to provide a finished optical fiber array shown in FIG. 9. It is preferred that after the projecting portions of the optical fibers 11 have been severed, the end surface of the optical fibers 11 are grinded and polished. In such case, the end surface of the optical fiber aligning implement 30 (the end surfaces of the cover member 32 and the substrate 31) may be grinded and polished together with the end surfaces of the optical fibers 11.

Further, though not shown, there may be such a utilization that portions of the optical fibers 11 projecting from the end surface of the optical fiber aligning implement 30 are cut even in a state that a fixed length of each optical fiber 11 is projected from the end surface of the optical fiber aligning implement 30, the projecting portions of a fixed length of the optical fibers 11 are put in V-grooves of a substrate one projecting portion for one V-groove, the pitch of the V-grooves of the substrate being the same as that of the optical fibers 11, and they are coupled to the substrate.

Next, a second embodiment of the aligning implement for optical fibers according to the present invention will be described with reference to FIGS. 12 and 13.

Figure 12A:
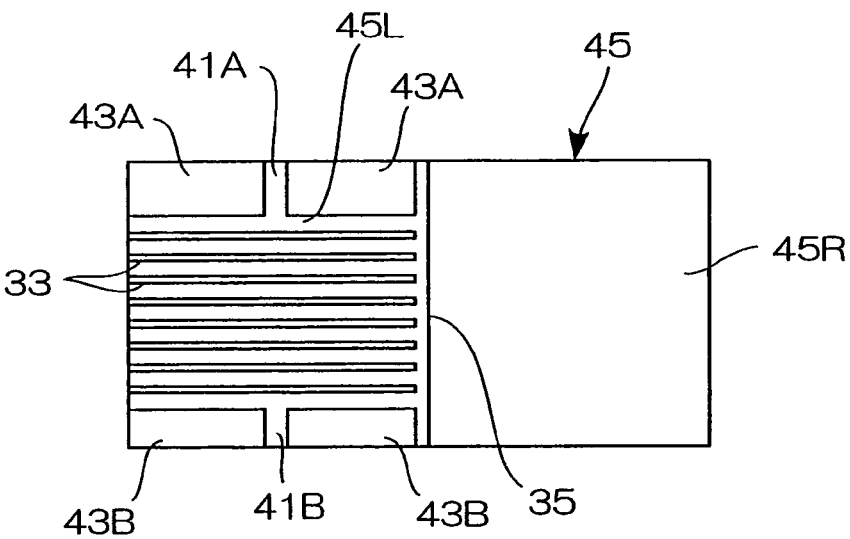
FIG. 12A is a plan view of the substrate.
Figure 12B:
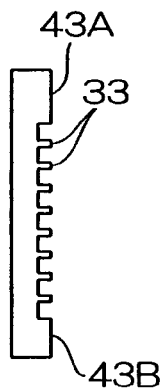
FIG. 12B is a left-hand side view of FIG. 12A
Figure 12C:
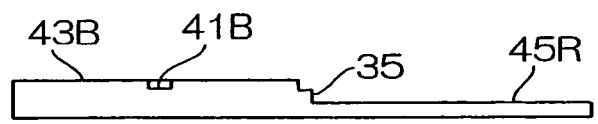
FIG. 12C is a bottom side view of FIG. 12A.
Figure 13A:
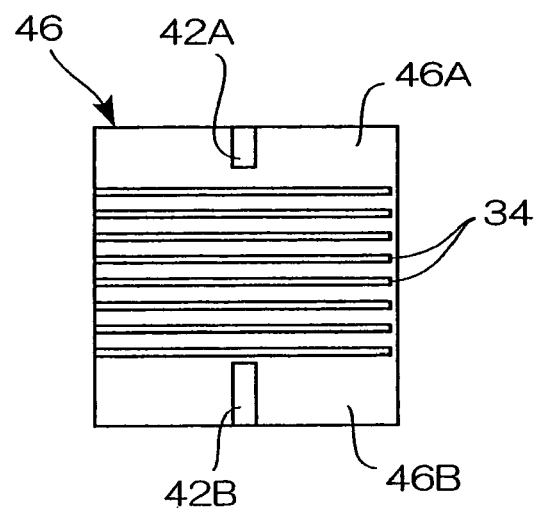
FIG. 13A is a plan view of the cover member.
Figure 13B:
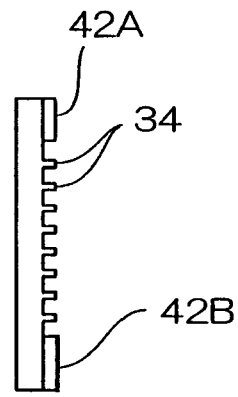
FIG. 13B is a left-hand side view of FIG. 13A
Figure 13C:
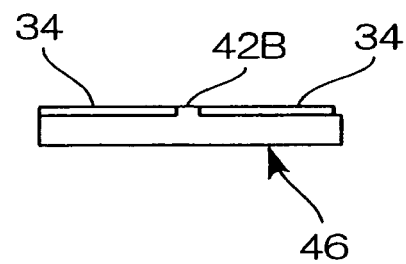
FIG. 13C is a bottom side view of FIG. 13A.

This optical fiber aligning implement of the second embodiment comprises a substrate 45 shown in FIG. 12 and a cover member 46 shown in FIG. 13. The substrate 45 is a plate-like member having a generally rectangular shape in plan as shown in FIG. 12, and likewise the substrate 31 in the first embodiment, on substantially the central portion of one surface (the top surface in this embodiment) of the substrate 45 is formed a step portion 35 extending linearly from the upper end thereof to the lower end thereof so that a first and a second areas 45L and 45R differing in thickness (height) thereof from each other are formed on both sides (left-hand side and right-hand side in the figure) of the linear step portion 35. The first area 45L has a generally square shape in plan and the second area 45R has a generally rectangular shape in plan. On the first area 45L are formed a plurality of (eight, in this embodiment) ridges or ribs 33 in parallel with one another with a predetermined pitch therebetween and with high accuracy. The ridges 33 extend from the left-hand edge of the first area 45L toward the second area 45R. The pitch of the ridges 33 is set to be equal to the pitch of optical fibers of an optical fiber array to be fabricated. Each ridge 33 has a generally rectangular shape in section, stands erect from the top surface of the substrate 45, and extends until a position that is a little short of the step portion 35. In addition, the second area 45R has its thickness thinner (its height lower) than that of the first area 45L.

In this second embodiment, on both sides of a generally rectangular area on which the eight ridges 33 are aligned and juxtaposed are formed elongate first and second cover member riding portions 43A and 43B on the first area 45L in the direction orthogonal to the ridges 33. The first and second cover member riding portions 43A and 43B have the same height as that of the ridge 33 and the same length as that of the ridge 33. The width of the first cover member riding portion 43A formed on the upper side portion in the figure is wider than that of the second cover member riding portion 43B formed on the lower side portion in the figure. At substantially the central portions of the first and second cover member riding portions 43A and 43B are formed respectively a first guide groove 41A of a predetermined width and a second guide groove 41B of a predetermined width in the direction orthogonal to the ridges 33. These guide grooves 41A and 41B have a generally rectangular or square shape in section.

The cover member 46 is a plate-like member having a generally square shape in plan as shown in FIG. 13A, and likewise the cover member 32 in the first embodiment, has a plurality of (eight, in this embodiment) ridges or ribs 34 formed on one surface thereof in parallel with one another with the same pitch as that of the ridges 33 of the substrate 45 and with high accuracy. The ridges 34 extend from the left-hand edge in the figure of the cover member 46 toward the right-hand edge thereof opposed to the left-hand edge. Each ridge 34 has a generally rectangular shape in section, stands erect from the bottom surface of the cover member 46, and extends until a position that is a little short of the right-hand edge.

On both sides of a generally rectangular area on which the ridges 34 are aligned and juxtaposed are provided elongate first and second regions 46A and 46B in the direction orthogonal to the ridges 34. The first and second regions 46A and 46B have substantially the same area. At substantially the central portions of the first and second regions 46A and 46B are formed respectively a first protrusion 42A and a second protrusion 42B in the direction orthogonal to the ridges 34. The first and second protrusions 42A and 42B have the same height as that of the ridge 34. These protrusions 42A and 42B have a generally rectangular or square shape in section. The length of the first protrusion 42A is set to be substantially equal to the length of the second guide groove 41B of the substrate 45 and the width thereof is set to have such a value that the first protrusion 42A can be fitted in the second guide groove 41B of the substrate 45 and slide in the direction orthogonal to the ridges 34. The length of the second protrusion 42B is set to be substantially equal to the length of the first guide groove 41A of the substrate 45 and the width thereof is set to have such a value that the second protrusion 42B can be fitted in the first guide groove 41A of the substrate 45 and slide in the direction orthogonal to the ridges 34.

In this manner, with the first and second guide grooves 41A and 41B provided on the substrate 45 as well as the first and second protrusions 42A and 42B provided on the cover member 46, which are fitted in the guide grooves 41B and 41A respectively and guided in the direction orthogonal to the ridges 33 (34), as in the first embodiment, in case of positioning the cover member 46 over the first area 45L of the substrate 45 and assembling the cover member 46 and the substrate 45 in such manner that each of the optical fibers is positioned between the ridge 34 of the cover member 46 and the corresponding ridge 33 of the substrate 45, the second protrusion 42B of the cover member 46 is fitted in the first guide groove 41A of the substrate 45 and the first protrusion 42A of the cover member 46 is fitted in the second guide groove 41B of the substrate 45. Accordingly, when the cover member 46 is slid in the direction that each optical fiber will be caught between the ridge 34 of the cover member 46 and the corresponding ridge 33 of the substrate 45, the first and second protrusions 42A and 42B of the cover member 46 are guided by the second and first guide grooves 41B and 41A of the substrate 45 respectively in the direction orthogonal to the ridges 33 (34). That is, the cover member 46 is reliably slides in the direction orthogonal to the ridges 33 (34) with the parallelism between the ridges 33 of the substrate 45 and the ridges 34 of the cover member 46 maintained. As a result, the optical fibers slide reliably and stably, and hence there is obtained an advantage that work of positioning and holding the optical fibers by the wall surfaces of the ridges 34 of the cover member 46 and the wall surfaces of the corresponding ridges 33 of the substrate 45 can be well carried out with high reliability.

Further, it is needless to say that if the first and second guide grooves 41A and 41B may be provided on the cover member 46 and the first and second protrusions 42A and 42B for being fitted in the guide grooves 41B and 41A respectively and guiding the cover member 46 in the direction orthogonal to the ridges 33 (34) may be provided on the substrate 45, the same function and effects can be obtained. In addition, the number of the guide grooves and the number of the protrusions are not limited to two.

Figure 14A:
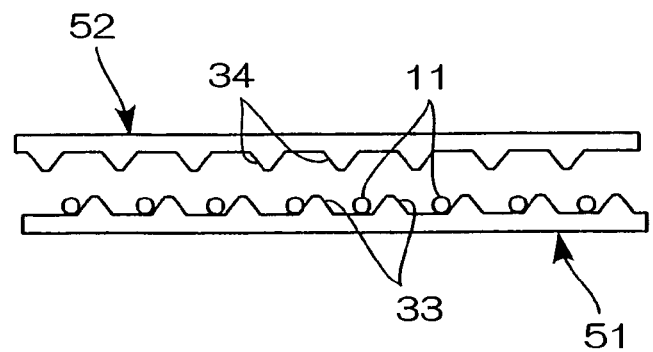
FIGS. 14A, 14B and 14C are front views for explaining a manufacturing process of the optical fiber array according to the present invention fabricated by use of a third embodiment of the aligning implement for optical fibers according to the present invention.
Figure 14B:
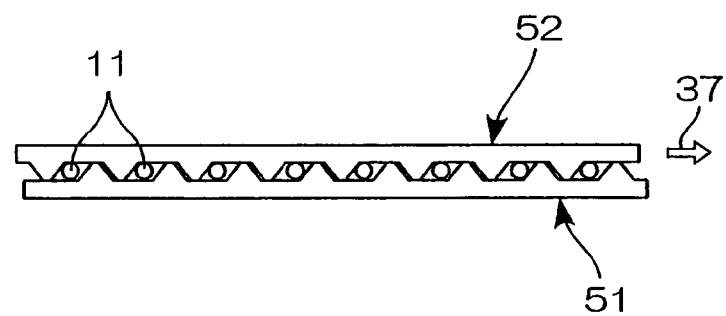
Figure 14C:
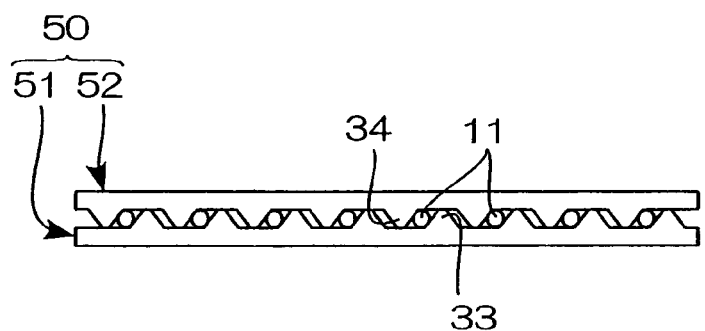

FIGS. 14A to 14C are front views for explaining a manufacturing process of the optical fiber array according to the present invention fabricated by use of a third embodiment of the aligning implement for optical fibers according to the present invention. This optical fiber aligning implement 50 of the third embodiment comprises a substrate 51 that is a plate-like member having a generally rectangular or square shape in plan and a cover member 52 that is a plate-like member having a generally rectangular shape in plan, likewise the first embodiment. The optical fiber aligning implement 50 may be one that has the same construction, structure and shape as those of the first embodiment already discussed with reference to FIGS. 9 to 11 except that a plurality of ridges or ribs 33 each having a generally isosceles trapezoidal shape in section are formed on the substrate 51 and a plurality of ridges or ribs 34 each having a generally isosceles trapezoidal shape in section are formed on the cover member 52, and therefore, the detailed explanation thereof will be omitted.

As stated above, in case of forming on the substrate 51 and the cover member 52 a plurality of ridges 33 and 34 each having a generally isosceles trapezoidal or trapezoidal or triangular shape in section, as shown in FIG. 14B, the ridges 34 of the cover member 52 also can be engaged with the ridges 33 of the substrate 51 in such manner that each of the optical fibers 11 is positioned between the ridge 34 of the cover member 52 and the corresponding ridge 33 of the substrate 51. In addition, since the slant wall surfaces of the ridges 34 of the cover member 52 and the slant wall surfaces of the corresponding ridges 33 of the substrate 51 are substantially in parallel with each other, when the cover member 52 is slid in the direction of an arrow 37 shown in the figure, each optical fiber 11 is moved by the slant wall surface of each ridge 34 of the cover member 52 toward the slant wall surface of the corresponding ridge 33 of the substrate 51 and is firmly nipped and held between these slant wall surfaces as shown in FIG. 14C. As a result, likewise the first embodiment, by use of the optical fiber aligning implement 50 of the third embodiment, the plural optical fibers 11 can be positioned, held and aligned with high precision. Thus, if the optical fiber aligning implement 50 of the third embodiment is used, the optical fiber array shown in FIG. 14C can easily be fabricated with high accuracy.

The substrate 51 having the ridges 33 formed thereon each having a generally isosceles trapezoidal shape in section discussed above and the cover member 52 having the ridges 34 formed thereon each having a generally isosceles trapezoidal shape in section discussed above may easily be manufactured with high accuracy by, for example, applying an anisotropic wet etching to a single crystal silicon substrate.

Figure 15A:
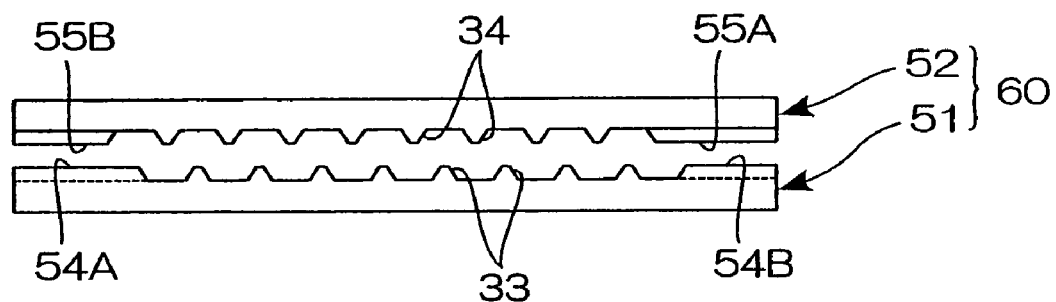
FIG. 15A is a front view showing a fourth embodiment of the aligning implement for optical fibers according to the present invention in a state that a cover member and a substrate of the aligning implement are being separated.
Figure 15B:
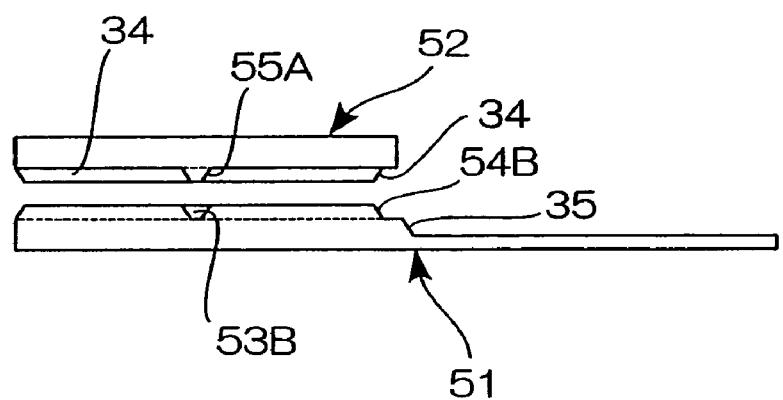
FIG. 15B is a right-hand side view of FIG. 15A.
Figure 16A:
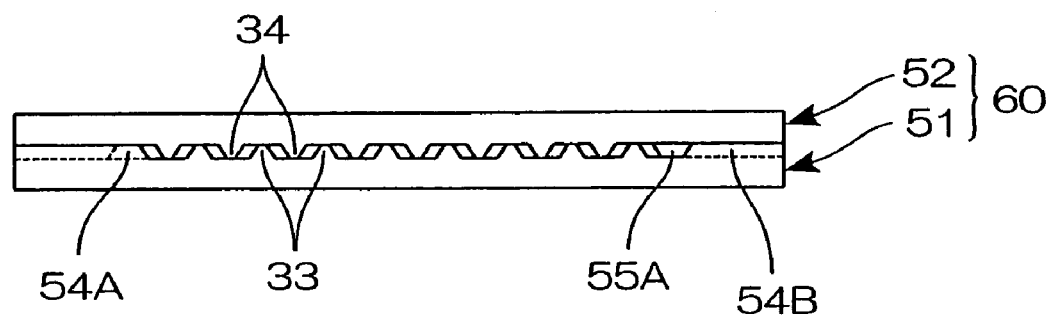
FIG. 16A is a front view showing a fourth embodiment of the aligning implement for optical fibers according to the present invention in a state that the cover member and the substrate of the aligning implement are engaged with each other.
Figure 16B:
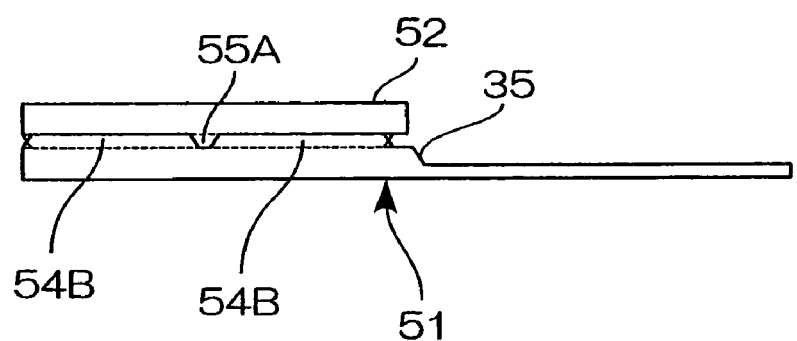
FIG. 16B is a right-hand side view of FIG. 16A.

FIGS. 15 and 16 show a fourth embodiment of the aligning implement for optical fibers according to the present invention comprising the substrate 51 and the cover member 52 in the above third embodiment except that the substrate 51 has a first and a second guide grooves 53A and 53B (53A is not seen in the figure) corresponding to the first and the second guide grooves 41A and 41B in the second embodiment provided in a first and a second cover member riding portions 54A and 54B (corresponding to the first and the second cover member riding portions 43A and 43B in the second embodiment) of the substrate 51 and that the cover member 52 has a first and a second protrusions 55A and 55B (corresponding to the first and the second protrusions 42A and 42B in the second embodiment) provided thereon, the first and the second protrusions 55A and 55B being fitting in the second and the first guide grooves 53B and 53A and being guided in the direction orthogonal to the ridges 33 (34). FIG. 15A is a front view showing the optical fiber aligning implement 60 of the fourth embodiment comprising the substrate 51 having the guide grooves 53A and 53B formed thereon and the cover member 52 having the protrusions 55A and 55B formed thereon in a state that the cover member 52 and the substrate 51 are being separated, and FIG. 15B is a right-hand side view of FIG. 15A. FIG. 16A is a front view showing the optical fiber aligning implement 60 of the fourth embodiment in a state that the cover member 52 and the substrate 51 are engaged with each other, and FIG. 16B is a right-hand side view of FIG. 16A. Further, in FIGS. 15B and 16B, a reference character 35 denotes a step portion that is formed at substantially the central portion of the substrate 51 and extending linearly from the upper end thereof to the lower end thereof, likewise the first, second and third embodiments.

With the construction of the fourth embodiment mentioned above, it is clear that the same advantages as those of the second embodiment can be obtained, and explanation thereof will be omitted. Further, in the fourth embodiment, it is needless to say that if the first and second guide grooves 53A and 53B may be provided on the cover member 52 and the first and second protrusions 55A and 55B for being fitting in the guide grooves 53B and 53A respectively and guiding the cover member 52 in the direction orthogonal to the ridges 33 (34) may be provided on the substrate 51, the same function and effects can be obtained. In addition, the number of the guide grooves and the number of the protrusions are not limited to two.

The substrate 51 and the cover member 52 of the optical fiber aligning implement 60 of the fourth embodiment may easily be manufactured with high accuracy by, for example, applying an anisotropic wet etching to a single crystal silicon substrate. At first, a method of manufacturing the substrate 51 will be described with reference to FIGS. 17 and 18.

FIGS. 17A to 17G are front views for explaining a manufacturing process of the substrate 51 of the optical fiber aligning implement 60 shown in FIGS. 15A and 16A, and FIGS. 18A to 18G are right-hand side views of FIGS. 17A to 17G, respectively.

Figure 17A:
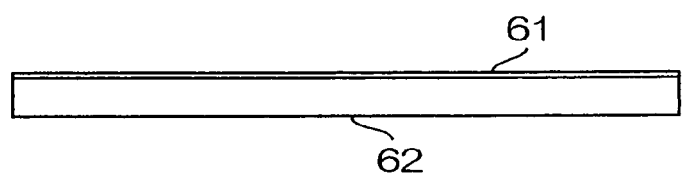
FIGS. 17A to 17G are front views for explaining a manufacturing process of the substrate of the aligning implement for optical fibers shown in FIGS. 15A and 16A.
Figure 17B:
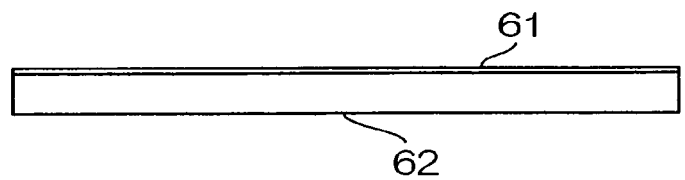
Figure 18A:
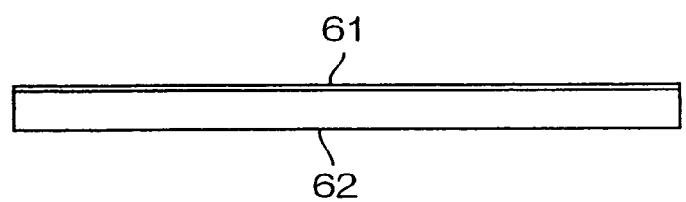
FIGS. 18A to 18G are right-hand side views of FIGS. 17A to 17G, respectively.
Figure 18B:
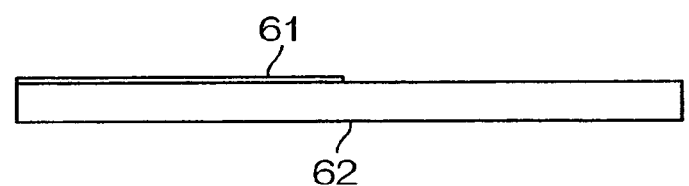

As shown in FIGS. 17A and 18A, there is prepared a plate-like single crystal silicon substrate 62 of a generally rectangle or square in plan that has an oxide film (thermally oxidized film) 61 formed on the top surface thereof. Next, by use of photolithography technology, the oxide film 61 on the top surface of the silicon substrate 62 is etched to remove a portion of the oxide film 61 corresponding to an area of the silicon substrate 62 on which the sheathings (jackets) 11B (refer to FIGS. 9 and 11) of the optical fibers 11 are to be put, as shown in FIGS. 17B and 18B.

Figure 17C:
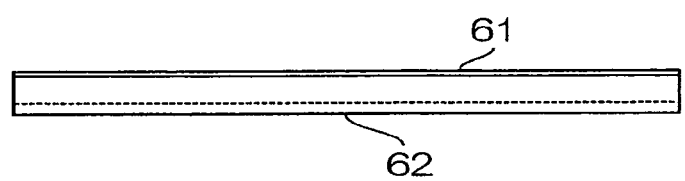
Figure 18C:
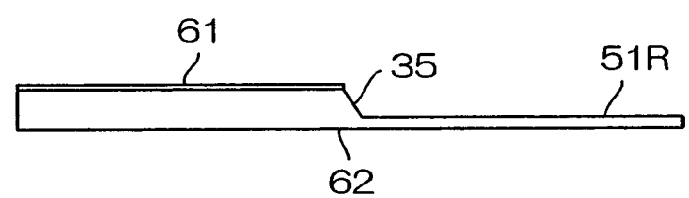

Thereafter, the silicon substrate 62 is etched by an anisotropic wet etching using the remaining oxide film 61 as a mask. As a result, as shown in FIGS. 17C and 18C, the portion of the silicon substrate 62 not covered with the oxide film 62 is etched and removed by a predetermined thickness thereby to form the step portion 35 and the area 51R on which the jackets 11B of the optical fibers 11 are to be put (a thinner area of a generally rectangle or square in plan on right-hand side of the step portion 35 in FIG. 15B).

Figure 17D:
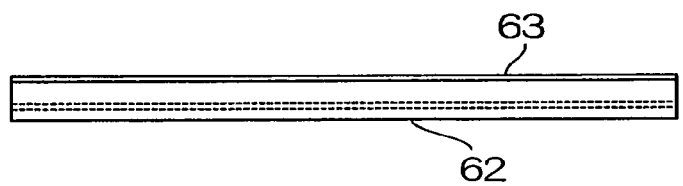
Figure 17E:
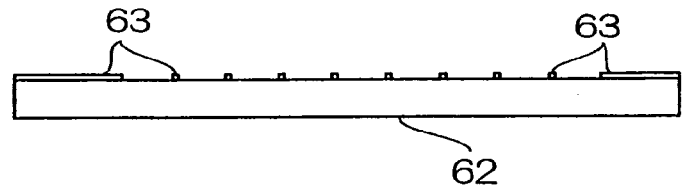
Figure 18D:
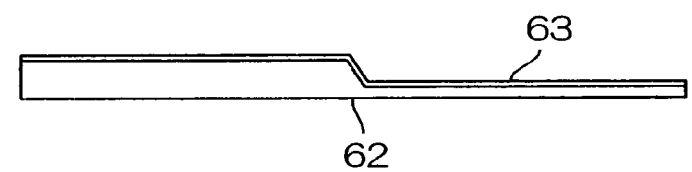
Figure 18E:
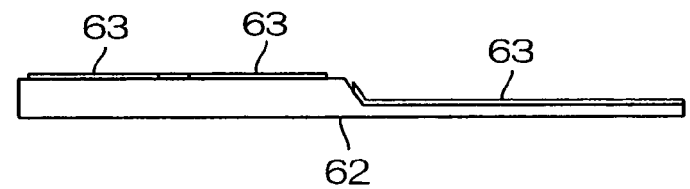

After the remaining oxide film 61 on the top surface of the silicon substrate 62 has been removed, as shown in FIGS. 17D and 18D, an oxide film 63 is again formed on all the top surface of the silicon substrate 62. Then, by use of photolithography technology, the oxide film 63 on the top surface of the silicon substrate 62 is etched to leave portions of the oxide film 62 corresponding to areas of the silicon substrate 62 on which the ridges 33 are to be formed as well as the first and the second cover member riding portions 54A and 54B are to be formed, as shown in FIGS. 17E and 18E. In this etching, as shown in FIG. 18E, portions of the oxide film 63 corresponding to areas of the central portions of the first and the second cover member riding portions 54A and 54B in which the first and the second guide grooves 53A and 53B are to be formed are removed. That is, a patterning of the oxide film 63 is carried out to leave portions of the oxide film 63 corresponding to the shapes or patterns of the ridges 33 as well as the first and the second cover member riding portions 54A and 54B.

Figure 17F:
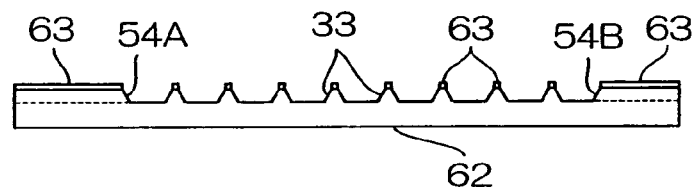
Figure 18F:
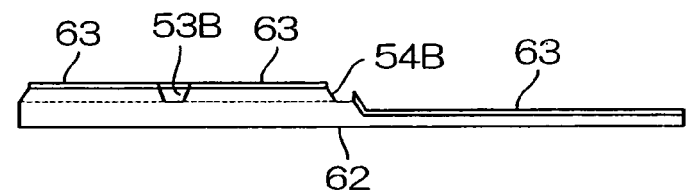

Next, the silicon substrate 62 is etched by an anisotropic wet etching using the patterned (remaining) oxide film 63 as a mask. As a result, as shown in FIGS. 17F and 18F, there are formed the plural (eight in this example) ridges 33 aligned in parallel with one another with high precision, each ridge 33 having a generally isosceles trapezoidal shape in section, the first and the second cover member riding portions 54A and 54B each having a generally rectangular shape in plan, and the first and the second guide grooves 53A and 53B (the guide groove 53B is not seen in the figures) each having a generally isosceles trapezoidal shape in section.

Figure 17G:
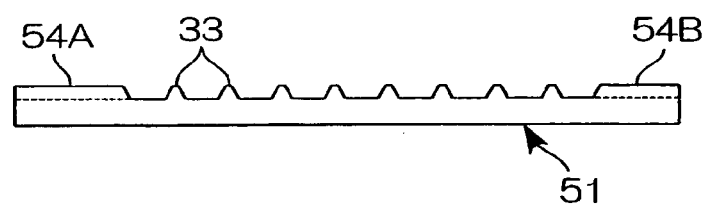
Figure 18G:
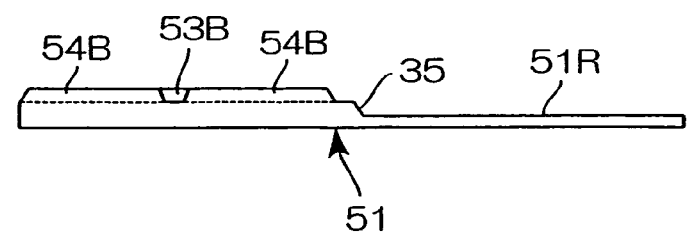

Thereafter, the remaining oxide film 63 on the top surface of the silicon substrate 62 is removed. Thus, the substrate 51 has been completed as shown in FIGS. 17G and 18G. Further, in practice, many substrates 51 are fabricated on a silicon substrate at the same time by the manufacturing process described above and thereafter, are separated to individual chips (substrates 51) by dicing.

Next, a method of manufacturing the cover member 52 will be described with reference to FIGS. 19 and 20. Further, in order to conform usage of the cover member 52, in FIGS. 19 and 20, the surface thereof on which the ridges 34 and the first and the second protrusions 55A and 55B are to be formed is shown as the bottom surface of the cover member 52 in these figures.

Figure 19A:
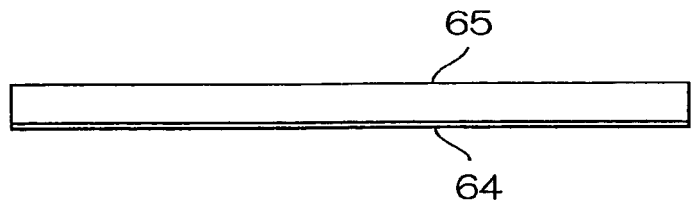
FIGS. 19A to 19D are front views for explaining a manufacturing process of the cover member of the aligning implement for optical fibers shown in FIGS. 15A and 16A.
Figure 19B:
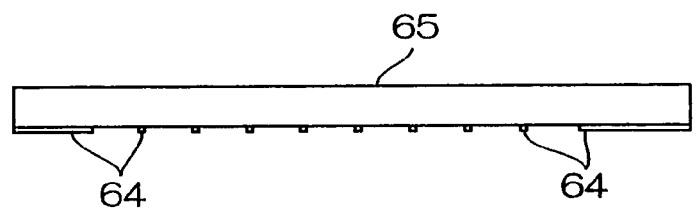
Figure 20A:
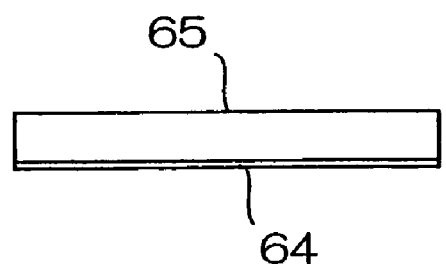
FIGS. 20A to 20D are right-hand side views of FIGS. 19A to 19D, respectively.
Figure 20B:
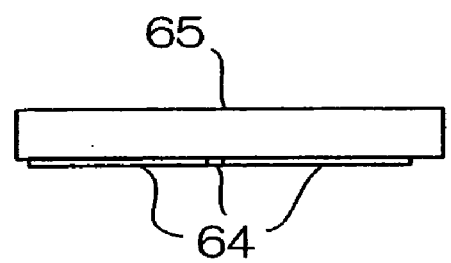

At first, as shown in FIGS. 19A and 20A, there is prepared a plate-like single crystal silicon substrate 65 of a generally rectangle or square in plan that has an oxide film 64 formed on the surface (the bottom surface in the figures) of the silicon substrate 65. Next, by use of photolithography technology, the oxide film 64 on the bottom surface of the silicon substrate 65 is etched to leave portions of the oxide film 64 corresponding to areas of the silicon substrate 65 on which the ridges 34 are to be formed as well as the first and the second protrusions 55A and 55B are to be formed, as shown in FIGS. 19B and 20B. That is, a patterning of the oxide film 64 is done to leave portions of the oxide film 64 corresponding to the shapes or patterns of the ridges 34 as well as the first and the second protrusions 55A and 55B.

Figure 19C:
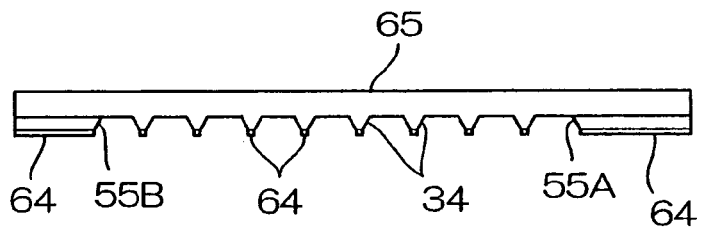
Figure 20C:
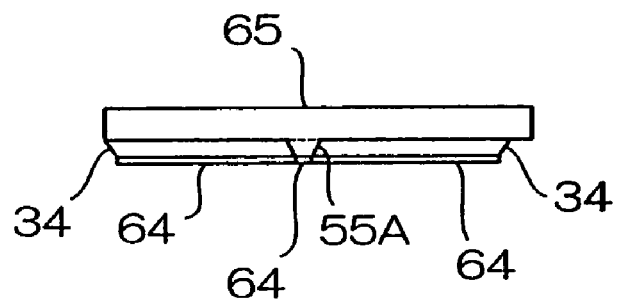

Next, the silicon substrate 65 is etched by an anisotropic wet etching using the patterned (remaining) oxide film 64 as a mask. As a result, as shown in FIGS. 19C and 20C, there are formed the plural (eight in this example) ridges 34 aligned in parallel with one another with high precision, each having a generally isosceles trapezoidal shape in section, and the first and the second protrusions 55A and 55B each having a generally isosceles trapezoidal shape in section.

Figure 19D:
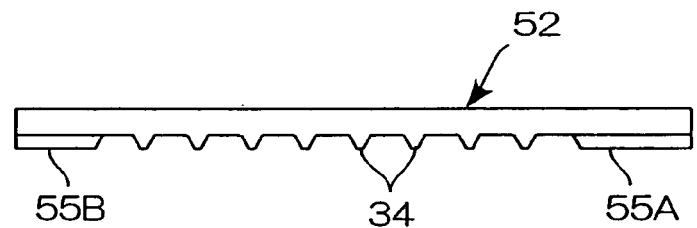
Figure 20D:
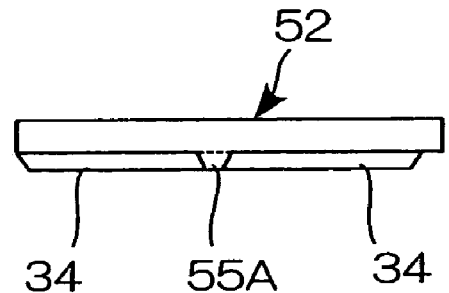

Thereafter, the remaining oxide film 64 on the top surface of the silicon substrate 65 is removed. Thus, the cover member 52 has been completed as shown in FIGS. 19D and 20D. Further, in case of the cover member 52, too, many cover members 52 are fabricated on a silicon substrate at the same time, in practice, by the manufacturing process described above and are separated to individual chips (cover members 52) by dicing.

As described above, in case a single crystal silicon substrate is used and that the substrate 51 and the cover member 52 are manufactured by use of photolithography technology and an anisotropic wet etching, there can easily be formed with high precision the plural ridges 33 and 34 aligned in parallel with one another with a predetermined pitch. Moreover, there is obtained an advantage that simultaneously with the formation of the ridges 33 and 34, the first and second guide grooves 53A and 53B as well as the first and second protrusions 55A and 55B can easily be formed with high accuracy.

Further, there can be also manufactured by use of a single crystal silicon substrate, as discussed above, the substrate 45 shown in FIG. 12 that has the plural ridges 33 of a generally rectangle in section and the first and second guide grooves 41A and 41B of a generally rectangle in section and the cover member 46 shown in FIG. 13 that has the plural ridges 34 of a generally rectangle in section and the first and second protrusions 42A and 42B of a generally rectangle in section. In such case, it is preferred that the ridges 33 and 34 each having vertical side surfaces (side walls) from the surface of the substrate, the protrusions 42A and 42B each having vertical side surfaces (side walls) from the surface of the substrate, and the like are formed by applying a dry etching to the single crystal silicon substrate. As the above dry etching, deep-RIE (Reactive Ion Etching) technology can be used.

In addition, without using a silicon substrate, the substrate 45 as shown in FIG. 12 and the cover member 46 as shown in FIG. 13 may be manufactured, for example, by using a metal such as a stainless steel or the like and cutting the metal.

As is apparent from the foregoing explanation, with the optical fiber aligning implement according to the present invention, each optical fiber is merely put in the space that is comparatively enough room for the optical fiber between the adjacent ridges of the substrate, and there is no need to align the optical fibers accurately. Accordingly, there is unnecessary a very complicated and troublesome work that requires great skill in which a plurality of optical fibers are disposed in V-grooves one fiber for one groove and accurately aligned, as in the prior art. Consequently, the work of putting the optical fibers on the substrate becomes very easy and the working hours can be greatly reduced, which results in an advantage that the working efficiency is remarkably improved.

In addition, the ridges of the cover member and the ridges of the substrate are merely engaged with one another in such manner that each of the optical fibers is located between one of the ridges of the cover member and the corresponding one of the ridges of the substrate, and the respective optical fibers are positioned and held by sliding the cover member relative to the substrate thereby to nip each optical fiber between the two wall surfaces of the two ridges. Therefore, each optical fiber has pushing forces or pressures applied thereto at the same positions in the axial direction. For this reason, the optical fibers can be stably positioned, held and aligned with high reliability. Thus, by use of the optical fiber aligning implement according to the present invention, there is obtained an advantage that the optical fiber array can easily be fabricated with high accuracy.

While the present invention has been described with regard to the preferred embodiments shown by way of example, it will be apparent to those skilled in the art that various modifications, alterations, changes, and/or minor improvements of the embodiments described above can be made without departing from the spirit and the scope of the present invention. Accordingly, it should be understood that the present invention is not limited to the illustrated embodiments, and is intended to encompass all such modifications, alterations, changes, and/or minor improvements falling within the scope of the invention defined by the appended claims.

What is claimed is:

1. An aligning implement for optical fibers for aligning a plurality of optical fibers that is adapted to be used in an optical fiber array having a plurality of optical fibers each having a diameter and aligned substantially in parallel with one another with a predetermined pitch therebetween, said aligning implement comprising:

a substrate having a plurality of ridges formed on one surface of the substrate and aligned substantially in parallel with one another with said predetermined pitch; and a cover member having a plurality of ridges formed on one surface of the cover member and aligned substantially in parallel with one another with said predetermined pitch, said one surface being opposed to said ridges of the substrate;

at least one guide groove that is formed on either one of the substrate or the cover member in a direction substantially orthogonal to the ridges; and at least one protrusion that is formed on the other one of the substrate or the cover member and is fitted in and guided by the guide groove, and wherein the width of the ridges of the substrate and the width of the ridges of the cover member are such that the cover member is movable relative to the substrate by a distance greater than the diameter of each optical fiber in the a direction substantially orthogonal to the ridges in a state that the ridges of the substrate and the ridges of the cover member are engaged with one another; and the substrate and the cover member are arranged such that in the state that the ridges of the substrate and the ridges of the cover member are engaged with one another, sliding of the cover member in the direction substantially orthogonal to the ridges relative to the substrate causes each optical fiber to be nipped, positioned and held between a wall surface of each ridge of the substrate and a wall surface of each corresponding ridge of the cover member.

2. The aligning implement for optical fibers as set forth in claim 1, wherein the one surface of the substrate is formed such that the thickness of one side thereof is thicker than that of the other side thereof, and the ridges are formed on the thicker side surface and optical fibers each having a sheathing are put on the thinner side surface, and wherein the thicker side surface on which the ridges are formed is covered by the cover member.

3. The aligning implement for optical fibers as set forth in claim 2, wherein both the substrate and the cover member have a plurality of ridges, each having a generally isosceles trapezoidal shape in section, aligned substantially parallel with one another with said predetermined pitch, said ridges being formed by applying an anisotropic wet etching to a silicon substrate.

4. An optical fiber array comprising the aligning implement for optical fibers as set forth in claim 3.

5. The aligning implement for optical fibers as set forth in claim 2, wherein both the substrate and the cover member have a plurality of ridges, each having a generally rectangular or square shape in section, aligned substantially parallel with one another with said predetermined pitch, said ridges being formed by applying a dry etching to a silicon substrate.

6. An optical fiber array comprising the aligning implement for optical fibers as set forth in claim 5.

7. An optical fiber array comprising the aligning implement for optical fibers as set forth in claim 2.

8. The aligning implement for optical fibers as set forth in claim 1, wherein both the substrate and the cover member have a plurality of ridges, each having a generally isosceles trapezoidal shape in section, aligned substantially parallel with one another with said predetermined pitch, said ridges being formed by applying an anisotropic wet etching to a silicon substrate.

9. An optical fiber array comprising the aligning implement for optical fibers as set forth in claim 8.

10. The aligning implement for optical fibers as set forth in claim 1, wherein both the substrate and the cover member have a plurality of ridges, each having a generally rectangular or square shape in section, aligned substantially parallel with one another with said predetermined pitch, said ridges being formed by applying a dry etching to a silicon substrate.

11. An optical fiber array comprising the aligning implement for optical fibers as set forth in claim 10.

12. An optical fiber array comprising the aligning implement for optical fibers as set forth in claim 1.

* * * * *